United States Patent [19]
Read

[11] Patent Number: 5,917,416
[45] Date of Patent: Jun. 29, 1999

[54] EASY TO INSTALL TEMPERATURE ALARM SYSTEM

[76] Inventor: Robert Michael Read, 2716 NE. 168th Ave., Vancouver, Wash. 98684

[21] Appl. No.: 08/821,967

[22] Filed: Mar. 11, 1997

[51] Int. Cl.⁶ .................................................. G08B 17/00
[52] U.S. Cl. .......................... 340/584; 340/585; 340/589
[58] Field of Search .................................. 340/585, 588, 340/589, 691, 584; 165/48.1, 254; 137/78.3, 624.11; 320/2, 39

[56] References Cited

U.S. PATENT DOCUMENTS

| | | | |
|---|---|---|---|
| 3,793,825 | 2/1974 | Dickhart et al. | 60/39.14 R |
| 4,250,021 | 2/1981 | Kashima et al. | 320/2 |
| 4,256,133 | 3/1981 | Coward et al. | 137/78.3 |
| 4,278,841 | 7/1981 | Regennetter et al. | 340/585 |
| 4,410,930 | 10/1983 | Yachabach | 362/145 |
| 4,853,693 | 8/1989 | Eaton-Williams | 340/588 |
| 4,864,763 | 9/1989 | Peikin | 43/18.1 |
| 4,882,564 | 11/1989 | Monroe et al. | 340/449 |
| 4,918,851 | 4/1990 | Peikin | 43/1 |
| 5,107,123 | 4/1992 | Shi | 250/372 |
| 5,217,064 | 6/1993 | Kellow et al. | 165/48.1 |
| 5,262,758 | 11/1993 | Nam et al. | 340/588 |
| 5,608,383 | 3/1997 | Neil | 340/588 |

OTHER PUBLICATIONS

"Grainger Industrial and Commercial Equipment and Supplies 1994 General Catalog No. 385," pp. 700, 705.

*Primary Examiner*—Jeffery A. Hofsass
*Assistant Examiner*—Van T. Trieu
*Attorney, Agent, or Firm*—Marger Johnson & McCollom, P.C.

[57] ABSTRACT

A temperature alarm system includes a temperature sensing module and an alarm circuit that are powered by a photocell and a battery that is charged by the photocell. The photocell normally provides enough power to operate the system and charge the battery. When the temperature sensing module senses a temperature that exceeds a predetermined alarm limit, it generates an alarm signal which activates an alarm circuit that generates a visual and/or audible alarm either immediately after the alarm signal is generated, or after the alarm signal has been generated for a period of time. The generation of the alarm signal and/or the alarm causes the system power consumption to increase, so the system begins to draw power from the battery. After the alarm condition is corrected, the system returns to normal power consumption, and the photocell provides enough power to operate the system and charge the battery.

7 Claims, 2 Drawing Sheets

EASY TO INSTALL TEMPERATURE ALARM SYSTEM

BACKGROUND OF THE INVENTION

1. Field of the Invention

This invention relates generally to temperature alarm systems and more particularly to easy-to-install temperature alarm systems for enclosed spaces such as refrigerators.

2. Description of the Related Art

Temperature alarm systems have long been used to monitor temperatures in enclosed spaces where perishables are stored such as refrigerators, walk-in coolers, freezers, etc. Such systems continuously monitor the temperature in the enclosed space and generate a visual and/or audible warning if the temperature exceeds certain limits. Stores and restaurants use these systems to protect their investment in perishable inventory, e.g., meats, dairy products, etc. Should the temperature in those cases rise too high, all of the perishable inventory could be ruined. As a result, temperature alarm systems are essential for modern stores and restaurants with perishable inventory.

An example of one such temperature alarm system is the SUPCO No. 3T187 sold by Grainger of Lincolnshire, Ill. The SUPCO temperature alarms allows the temperature alarm to be set at any temperature between −60 degrees to 170 degrees F. A liquid crystal display (LCD) is coupled to a temperature sensor and displays the temperature sensed thereby. A front panel allows the user to activate the alarm as well as activate a delay circuit in the alarm. The delay circuit waits a predetermined amount of time before activating the alarm after the specified temperature threshold has been violated. If the temperature remains above the specified temperature after the delay period has expired the alarm is activated. This prevents the alarm from being activated due to transient fluctuations in the temperature due to, for example, the refrigerator door being opened. If the delay circuit is not activated, the alarm is activated immediately upon the specified temperature threshold being violated.

The SUPCO temperature alarm, as with all other known temperature alarms, requires a 120 VAC power source to operate. Typically, the alarms come with a standard 4' to 5' power cord which severely limits the locations in which the system can be mounted. In order to mount the alarm in a convenient location, it is often necessary to install additional 120 VAC wiring. This adds significantly to the overall cost of the system since a licensed electrician must usually be retained to perform the work properly. It also presents a temptation to forego the cost of an electrician and run an extension cord to the unit, thereby creating hazardous conditions due extension cords dangling from fixtures and lying on floors. Connecting a temperature alarm system to a 120 VAC power source also increases susceptibility to blown fuses and other power outages. Further, if the internal circuitry requires DC power, an expensive and bulky DC power supply must be included in the system.

Accordingly, a need remains for a temperature alarm system that is compact, reliable, inexpensive, and easy to install.

SUMMARY OF THE INVENTION

It is, therefore, an object of the invention to provide a temperature alarm system that operates from its own power supply.

Another object of the invention is to operate a temperature alarm system with power generated from ambient light.

Another object of the invention is to provide a temperature alarm system that can be installed easily and inexpensively.

A further object of the invention is to provide a temperature alarm system that is not susceptible to power outages.

One aspect of the present invention is a temperature alarm system including a temperature sensing module that generates an alarm signal when it senses a predetermined temperature, an alarm that generates a warning responsive to the alarm signal, and a photocell that provides electric power to the system. The photocell allows the temperature alarm system to be quickly and easily mounted thereby significantly reducing the cost of installation. Moreover, the system can be mounted in any convenient location regardless of the location of a 120 VAC power outlet.

In a preferred embodiment, the system includes a battery coupled to the alarm to provide power to the alarm. The photocell is coupled to the battery to charge the battery. The system has two rates of power consumption: a charge rate of power consumption and an alarm rate of power consumption that is higher than the charge rate of power consumption. The photocell has a power generating capacity sufficient to provide at least the charge rate of power consumption. The battery coupled to the alarm has a charge storage capacity sufficient to provide the alarm rate of power consumption for the duration of the warning.

The system can include a first battery coupled to the temperature sensing module to provide power to the temperature sensing module at a first electrical potential, and a second battery connected in series with the first battery. The first and second batteries are coupled to the alarm to provide power to the alarm at a second electrical potential.

The alarm can include a delay circuit that delays the warning for a predetermined period of time after the temperature sensing module generates the alarm signal.

The alarm can include a visual alarm that generates a visual warning responsive to the alarm signal. The visual alarm can be a light emitting diode or a liquid crystal display. The alarm can also include an audible alarm that generates an audible warning responsive to the alarm signal. The audible alarm can include a buzzer.

Another aspect of the present invention is a temperature alarm system including a temperature sensing module having an output terminal, the temperature sensing module generating an alarm signal at the output terminal when a predetermined temperature is sensed; an alarm having an input terminal connected to the output terminal of the temperature sensing module, the alarm generating a warning responsive to the alarm signal; a battery connected to the temperature sensing module and the alarm to provide power to the module and alarm; and a photocell connected to the battery to charge the battery.

Another aspect of the present invention is a method of monitoring a temperature including converting ambient light into electric power; supplying the electric power to a temperature monitoring system; detecting the temperature; and generating a warning if the detected temperature violates a temperature threshold. The method can also include the step of storing the electric power in a battery and the step of providing the electric power stored in the battery to the alarm.

The step of generating a warning can include actuating a buzzer, actuating a light emitting diode, or displaying a warning on a liquid crystal display.

The foregoing and other objects, features and advantages of the invention will become more readily apparent from the following detailed description of a preferred embodiment of the invention which proceeds with reference to the accompanying drawings.

DETAILED DESCRIPTION

Figure 1:
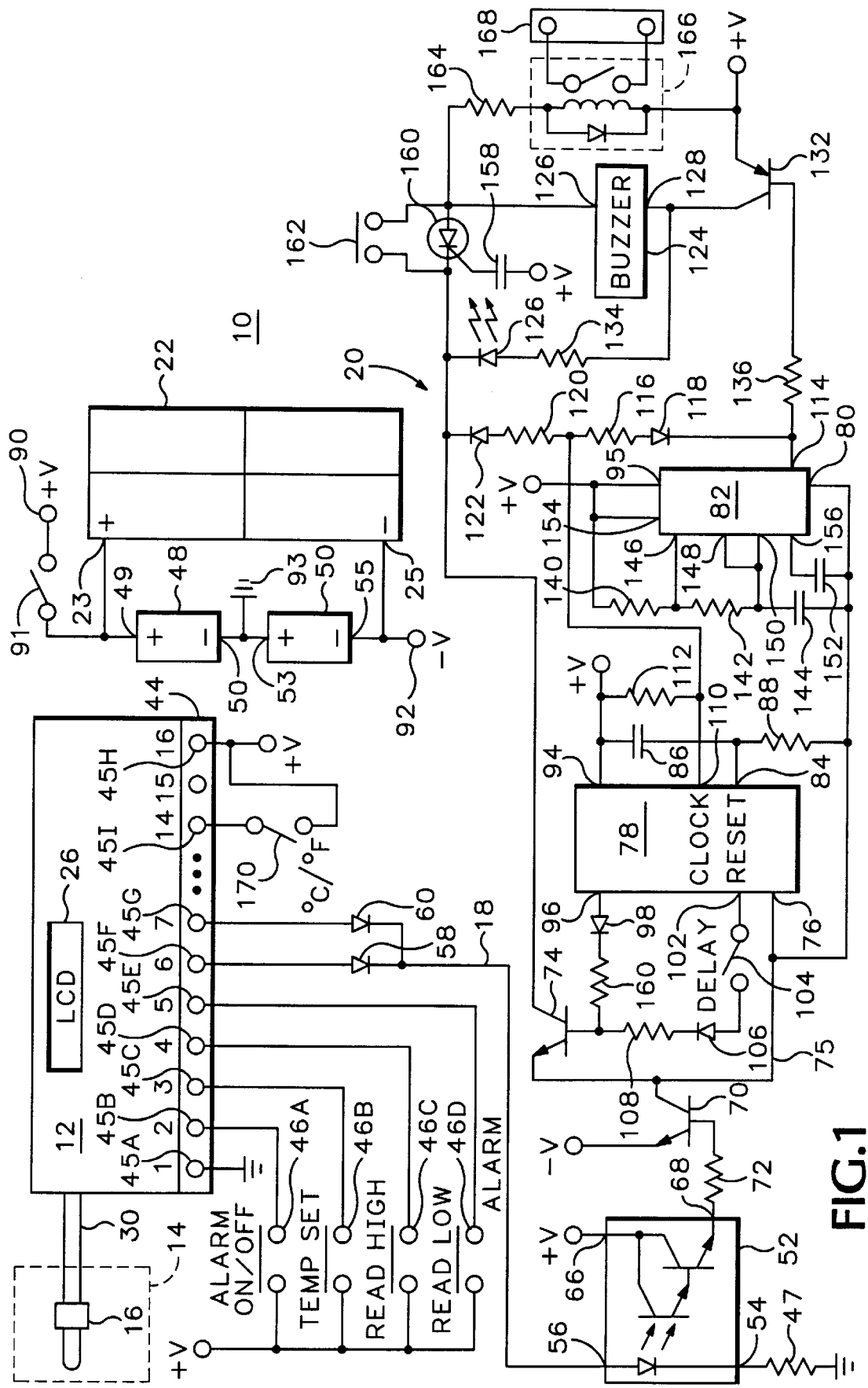
FIG. 1 is a schematic diagram of a temperature alarm system in accordance with the present invention.

Indicated generally at 10 in FIG. 1 is an embodiment of a temperature alarm system constructed in accordance with the present invention.

Prior to describing the detailed structure of the temperature alarm system 10, the key components of the invention will be identified followed by a brief description of the operation of the system. Then a more detailed description of each of the components will be provided along with a more detailed description of the operation.

Referring to FIG. 1, the system includes an electronic temperature sensing module 12 that senses the temperature in an enclosed space 14, typically a refrigerator, using a thermocouple probe 16. The probe is coupled to the sensing module 12 by thermocouple cable 30. If the temperature sensing unit senses a temperature that violates a preset alarm limit, it generates an alarm signal (ALARM) on line 18. The alarm signal is coupled to an alarm circuit 20 (also referred to as an alarm) via line 18. The alarm generates a visual and/or audible warning in response to the alarm signal. The alarm circuit can be configured to generate the warning immediately upon sensing the alarm signal, or alternatively, it can be configured to generate the warning only after the temperature violates the preset alarm limit for a predetermined period of time.

Electric power is provided to the system 10 by a photocell 22 and/or batteries 48 and 50. The temperature sensing module 12 generally consumes very little power, and when the alarm circuit 20 is not generating a warning, it consumes a negligible amount of power. The photocell 22 provides enough power from ambient light to run the system and also charge the batteries when the alarm circuit is not generating a warning. In the preferred embodiment, the alarm circuit consumes considerably more power than the photocell can provide when it generates an alarm, and thus, power must be drawn from the batteries. The system 10 permits the operator to reset the alarm. When the alarm is reset, the system returns to a normal mode of operation wherein the photocell provides enough power to run the system and recharge the batteries. Alternatively, if a large enough photocell is used, the photocell could generate sufficient power to supply the alarm circuit while it is generating a warning.

More detailed consideration will now be given to the structure of the temperature alarm system 10 of the present invention. Referring to FIG. 1, photocell 22 is a photovoltaic array comprised of four commercially available photovoltaic cells, each capable of generating 1.55 volts at 18 microamps ($\mu$A) when exposed to a florescent light source that supplies 200 lux or an incandescent light source that supplies 40 lux. The arrays are connected in series and thus, can generate 6.4 volts at 18 $\mu$A.

The photocell 22 includes a positive terminal 23 connected to the positive terminal 49 of volt battery 48 and one terminal of single pole, single throw (SPST) switch 91. The other terminal of switch 91 forms a positive (+V) system power supply 90. The photocell also includes a negative terminal 25 connected to the negative terminal 55 of battery 50 which forms a negative (−V) system power supply 92. The negative terminal 51 of battery 48 is connected to the positive terminal 53 of battery 50, thereby forming a system ground 93. Battery 48 preferably operates at 1.5 volts, while battery 50 preferably operates at 4.5 volts. Thus, batteries 48 and 50 are connected in series, and together form a 6 volt power supply for the alarm circuit indicated generally at 20.

Temperature sensing module 12 is a commercially available digital thermometer module such as a type no. MB-TMB880EXL which is commonly used in panel mount digital thermometer units such as the ELECTRO-THERM (™) model PM120 manufactured by Cooper Instrument Corporation of Middlefield, Conn. Module 12 can be programmed with high and low temperature alarm settings, both of which can be armed or disarmed independently. The module has an LCD display 26 for displaying the measured temperature, high and low temperature limits, and an alarm temperature which the display locks onto when a temperature alarm limit is exceeded. The module senses temperature with an external thermocouple probe 16 which is connected to the module by a thermocouple cable 30.

The temperature sensing module 12 includes a card-edge type terminal strip 44 for interfacing the module to other devices. The function and connection the terminals are as follows:

| No. | Function | Direction | Connection |
|---|---|---|---|
| 45A | ground | N/A | system ground 93 |
| 45B | ALARM ON/OFF | input | switch 46A |
| 45C | TEMP SET | input | switch 46B |
| 45D | READ HIGH | input | switch 46C |
| 45E | READ LOW | input | switch 46D |
| 45F | alarm output | output | anode of diode 58 |
| 45G | alarm output | output | anode of diode 60 |
| 45H | Power | N/A | +V power supply 90 |
| 45I | Display ° C./° F. | input | switch 170 |

Positive power supply terminal 45H of module 12 is connected to the +V power supply 90. Negative power supply terminal 45A of module 12 is connected to system ground 93. Switches 46A, 46B, 46C and 46D are normally open, momentary contact SPST pushbutton switches. Each switch has one terminal connected to the +V power supply 90 and another terminal connected to a terminal on the terminal strip 44 as indicated in the table above. Terminal 45I is connected to the +V power supply 90 through a SPST switch 170 which switches the module display mode between degrees Celsius and degrees Fahrenheit.

The alarm circuit 20 includes a commercially available opto-isolator module 52 having a Darlington pair output. The cathode terminal 54 of the LED of opto-isolator module 52 is connected to system ground, e.g., negative terminal 51 of battery 48. The anode terminal 56 of the LED of opto-isolator module 52 is connected to line 18 (ALARM) which is connected to the cathode terminals of diodes 58 and 60. The anode of diode 58 is connected to alarm output terminal number 6 of terminal strip 44 of temperature sensing module 12. The anode of diode 60 is connected to a second alarm output terminal 7 of terminal strip 44 of temperature sensing module 12.

The collector terminal 66 of the photo Darlington of opto-isolator module 52 is connected to the +V power supply. The emitter terminal 68 of the photo Darlington of opto-isolator module 52 is connected to the base of NPN transistor 70 through resistor 72 which preferably has a resistance of 2.2 Kilo-ohms (K). The emitter of transistor 70 is connected to the −V power supply 92.

The collector of transistor 70 forms an interruptible negative power supply on line 75 and is connected to the emitter of NPN transistor 74, the negative power supply terminal 76 of counter integrated circuit (IC) 78, and the negative power supply terminal 80 of oscillator IC 82. The positive power supply terminals 94 and 95 of counter IC 78 and oscillator IC 82, respectively, are connected to the +V power supply 90.

Counter IC 78 has a reset terminal 84 which is connected to the +V power supply 90 through capacitor 86 which preferably has a capacitance of 0.01 microfarads ($\mu$F). Reset terminal 84 is also connected to the interruptible negative power supply line 75 through resistor 88 which preferably has a resistance of 22K. Counter IC 78 has a Q12 counter output terminal 96 which is connected to the anode of diode 98. The cathode of diode 98 is connected to the base of transistor 74 through resistor 100 which preferably has a resistance of 2.2K. Counter IC 78 also has a Q3 counter output terminal 102 which is connected to one terminal of a DELAY switch 104 which is the single pole, single throw (SPST) type. The other terminal of the DELAY switch 104 is connected to the anode of diode 106. The cathode or diode 106 is connected to the base of transistor 74 through resistor 108 which preferably has a resistance of 2.2K.

Counter IC 78 has a clock terminal 110 which is connected to the +V power supply 90 through resistor 112 which preferably has a resistance of 100K. Clock terminal 110 is also connected to the oscillator output terminal 114 of oscillator IC 82 through resistor 116 and diode 118. The anode of diode 118 is connected to one terminal of resistor 116 which preferably has a resistance of 22K, and the cathode is connected to the oscillator output terminal 114. The other terminal of resistor 116 is connected to the clock terminal 110. Clock terminal 110 is further connected to the anode of diode 122 through resistor 120 which preferably has a resistance of 470 ohms. The cathode of diode 122 is connected to the collector of transistor 74.

Oscillator IC 82 includes a reset terminal 154 which is connected directly to the +V power supply 90, and a discharge terminal 146 which is connected to the +V power supply 90 through resistor 140 which preferably has a resistance of 100K. Oscillator IC 82 also includes a trigger terminal 148 and threshold terminal 150 which are connected directly together and connected to discharge terminal 146 through resistor 142 which preferably has a resistance of 56K. The trigger and threshold terminals 148, 150 are also connected to the interruptible negative power supply on line 75 through a capacitor 152 which preferably has a capacitance of 10 $\mu$F. The oscillator IC 82 also includes a control voltage terminal 156 which is connected to one terminal of capacitor 152 which preferably has a capacitance of 0.01 $\mu$F. The other terminal of capacitor 152 is connected to the interruptible negative power supply on line 75.

Alarm circuit 20 includes an audible devices which is preferably a piezoelectric buzzer 124 which has a negative terminal 126 connected to the anode of a silicon controlled rectifier (SCR) 160, and a positive terminal 128 connected to the collector of a PNP transistor 132. The cathode of SCR 160 is connected to the cathode of diode 122, and the gate of SCR 160 is connected to the + volt power supply through a 0.01 $\mu$F capacitor 158. A normally open, SPST momentary contact SILENCE switch 162 is connected across the cathode and anode of SCR 160.

The alarm circuit also includes a relay 166 having a pair of SPST normally open contacts which are connected to two screw terminals on a terminal block 168. The relay 166 includes a coil having one terminal connected to the + volt power supply and a second terminal connected to the anode of SCR 160 through a 100 ohm resistor 164. The relay 166 also includes a diode connected in antiparallel across the coil.

The alarm circuit further includes a visual device which is preferably an LED 126. The cathode of LED 126 is connected to the collector of transistor 74, and the anode is connected to the collector of transistor 132 through resistor 134 which preferably has a resistance of 100 ohms. The emitter of transistor 132 is connected to the +V power supply 90, and the base of transistor 132 is connected to the oscillator output terminal 114 of oscillator IC 82 through resistor 136 which preferably has a resistance of 22K.

All diodes are preferably inexpensive, general purpose, small signal diodes such as 1N4001. All resistors are preferably inexpensive ¼ watt metal film resistors with 10 percent or better tolerance. Capacitors 86 and 152 are preferably inexpensive ceramic monolithic capacitors rated at 50 volts, and capacitor 144 is an inexpensive electrolytic capacitor. Transistors 70, 74, and 132 are preferably inexpensive, general purpose, small signal devices such as 2N2222 and 2N3906. SCR 160 is preferably an industry standard type 2N5060 rated at 0.8 amps and 100 volts DC. Counter IC 58 is a commercially available CMOS 4020 counter IC, and oscillator IC 82 is inexpensive, commercially available CMOS 555 timer IC. Opto-isolator module 52 can be any inexpensive, commercially available high-gain device having relatively low drive current requirements for the LED portion. The buzzer 124 and LED 126 are preferably inexpensive, high intensity, high efficiency PC board mount devices. Relay 166 can be any suitable PC board mount device preferably having a coil resistance of about 500 ohms. The DELAY switch 104, the ° C./° F. switch 170, and the SYSTEM ON/OFF switch 90 are preferably implemented with a four-switch PC board mounted DIP switch assembly. The remaining switches are preferably implemented as membrane touch switches fabricated integral with a face plate as described below.

More detailed consideration will now be given to the operation of the temperature alarm system 10 of the present invention with reference to FIG. 1.

Switches 46A,B,C,D are used to program the various features of temperature sensing module 12. Normally, the temperature sensing module reads the temperature from thermocouple probe 18 every 15 seconds and displays the temperature on LCD display 26. When switch 46C is closed, the high temperature alarm setting is displayed on LCD display 26. The high temperature alarm setting can be changed by closing switches 46C and 46B simultaneously. When switch 46D is closed, the low temperature alarm setting is displayed on LCD display 26. The low temperature alarm setting can be changed by closing switches 46D and 46B simultaneously. Closing switches 46C and 46A simultaneously activates the high temperature alarm if it is inactive, or deactivates it if it is active. When active, the word MAX appears in the display. Closing switches 46D and 46A simultaneously activates the low temperature alarm if it is inactive, or deactivates it if it is active. When active, the word MIN appears in the display.

If the temperature read by module 12 ever exceeds the limit of a high or low temperature alarm setting that is active, the module generates an alarm signal by driving the alarm terminals 6 and 7 of terminal strip 44 to a logic high state. The module continues to drive terminals 6 and 7 high until the alarm setting is no longer violated, the setting is deactivated, or the system power switch 91 is opened. When an alarm setting is first violated, the module locks the display onto the alarm temperature for one minute, then returns to normal operation. Alternatively, the module could display a warning message on the liquid crystal display.

When temperature sensing module 12 drives terminals 6 and 7 high, current flows through diodes 58, 60 and the LED in the opto-isolator module 52, thereby driving the photo-Darlington on. When the photo-Darlington in module 52 is driven on, it drives transistor 70 into saturation through resistor 72. The collector of transistor 70 then acts as a negative power supply through line 75, thus energizing counter IC 78 and oscillator IC 82. Since oscillator IC 82 is configured as a bistable multivibrator, as is known in the art, it begins generating a square wave signal at terminal 114 having an amplitude of approximately 6 volts and a frequency of approximately 1.5 Hz. The oscillator IC is configured to generate an asymmetric signal, i.e., the high portion of the cycle is several times longer than the low portion of the cycle. The square wave signal from the counter IC is used to drive the clock input 110 of the counter IC through resistor 116 and diode 118. Resistor 112 is necessary to pull the clock line high during positive cycle of the square wave since diode 118 blocks the signal during the positive cycle.

The square wave signal from the oscillator IC is also used to intermittently drive transistor 132 into saturation, thereby providing an intermittent positive power source to buzzer 124 and LED 126. Since the square wave from oscillator IC 82 is asymmetric, the buzzer and LED will be energized at a low duty cycle, thereby imparting a flashing appearance to the LED and a short beeping or chirping sound to the buzzer. Buzzer 124 and LED 126 will not be energized, however, until transistor 74 is driven into saturation to provide a negative power supply.

When power is first applied to counter IC 78, it is held in reset for a few milliseconds (ms) due to the time delay created by capacitor 86 and resistor 88. As the counter IC comes out of reset, the two counter output terminals 96 and 102 are at low logic levels. The counter IC then begins counting at the rate determined by the oscillator IC, typically 1.5 Hz. The Q3 counter output terminal 102 is connected to a counter stage which divides the clock by a eight, and thus it is driven to a high logic level after a time delay of only approximately ten seconds. The Q 12 counter output terminal 96 is connected to a counter stage which divides the clock signal by 4096 and thus is driven to a high logic level after a delay of approximately 50 minutes.

Diodes 98 and 106 act as a diode OR so that either of counter output terminals 96 and 102 can drive transistor 74 into saturation when driven to a logic high level. If DELAY switch 104 is closed, transistor 74 will be driven into saturation by the first counter output 102 almost immediately after counter IC 78 comes out of reset. If the DELAY switch is closed, transistor 74 will be driven into saturation by the second counter output 102 after a delay of approximately 40 minutes.

When transistor 74 is driven into saturation, it acts as a negative power supply for LED 126. Transistor 74 also acts as negative power supply for buzzer 124 and relay 166 through SCR 160 which is gated on by capacitor 158. The intermittent positive power supply provided by transistor 132 drives LED 126 and buzzer 124 on intermittently, thereby creating a flashing visible warning and an intermittent audible warning. Since the positive power supply for the relay 166 is provided by the + volt power supply 90, the relay remains energized and the relay contacts, which are connected to terminal board 168, remain closed as long as transistor 74 remains in saturation and SCR 160 remains on.

The SILENCE switch 162 allows the operator to disable the buzzer without completely disabling the entire system. When the SILENCE switch is closed, it short circuits SCR 160, thereby turning the SCR off. This causes the buzzer and relay to be de-energized even though the LED continues to flash. The SCR remains off until the next time transistor 74 is switched from off to on. An advantage of the manner in which the SILENCE switch and SCR are connected is that it allows the buzzer to be reactivated the next time the alarm signal is generated without requiring any action by the operator. Thus, if the operator disables the buzzer by pressing the SILENCE switch, the operator does not need to remember to re-enable the buzzer after the alarm condition is corrected.

When transistor 74 is driven into saturation, it also drives the clock input 110 low through diode 122 and resistor 120, thereby latching the counter outputs 96, 102 which then causes transistor 74 to be held in saturation. The alarm circuit is thus latched in a warning generating mode and will remain in this mode until the temperature sensing module 12 deactivates the alarm signal on line 18 by driving the alarm output terminals 6 and 7 to a low logic level, thereby de-energizing the opto-isolator module 52 which in turn interrupts the negative power supply on line 75 to the alarm circuit. The temperature sensing module may deactivate the alarm signal in response to the operator disabling the alarm, or in response to the measured temperature returning to within the alarm limits.

If at any time during the 40 minute time delay the temperature sensing module deactivates the alarm signal, counter IC 78 will be reset due to the interruption of the negative power supply on line 75 and will begin counting out a 40 minute delay the next time the alarm signal is activated.

Temperature sensing module 12 generally consumes very little power when monitoring temperature or when it is being configured using switches 46. For example, the PM 120 model discussed above typically draws about 7 microamps ($\mu A$) when not generating an alarm signal. When the ALARM signal on line 18 is inactive, the alarm circuit 20 consumes almost no power except that caused by leakage current though opto-isolator 52 and transistor 70. Since photocell 22, can usually generate approximately 36 $\mu A$, the remainder of the current "trickle charges" the batteries 48, 50 and maintains the batteries in a fully charged state. This is referred to as the charge rate of power consumption.

When the photo-Darlington in module 52 is driven on, alarm circuit 20 draws power at rate that is determined by the state of the DELAY switch 104. If the DELAY switch is open, the alarm circuit will typically draw approximately 760 $\mu A$ due to the operation of the oscillator IC 82 and the counter IC 78. Thus, current will be drawn from batteries 48 and 50 since photocell 22 can only supply about 36 $\mu A$. If the DELAY switch 104 is open, or after the counter times out, the buzzer and/or the LED are energized, and the alarm circuit draws approximately 4 milliamps (mA). Thus, substantially more power is drawn from the batteries. This is referred to as the alarm rate of power consumption.

In a preferred embodiment, battery 48 is preferably a standard type "AA" 1.5 volt cell, and 50 is implemented as three standard type "AA" 1.5 volt cells connected in series to form a 4.5 volt battery. Thus, a total of four AA cells are required to run the system. The batteries should have sufficient charge storage capacity to supply the alarm rate of power consumption for several weeks, which is much longer than the duration of a typical warning which should usually be terminated by the operator after a few minutes, or a few hours if the unit is left unattended. The battery 48 can also supply reserve operating power for the temperature sensing module 12 if the light source to the photocell is ever interrupted.

After the alarm signal 18 is deactivated, the system's power consumption returns to the lower, charge rate and batteries 48, 50 are recharged by the photocell. If alarm conditions requiring a visual and/or audible warning are infrequent, the photocell can maintain the operation of the system for an extended period of time which is typically limited by the operational life of the batteries. If normal carbon or alkaline batteries are used, the operational life of the batteries will typically be longer than the normal shelf life for the batteries due to the charging effects of the photocell.

Figure 2:
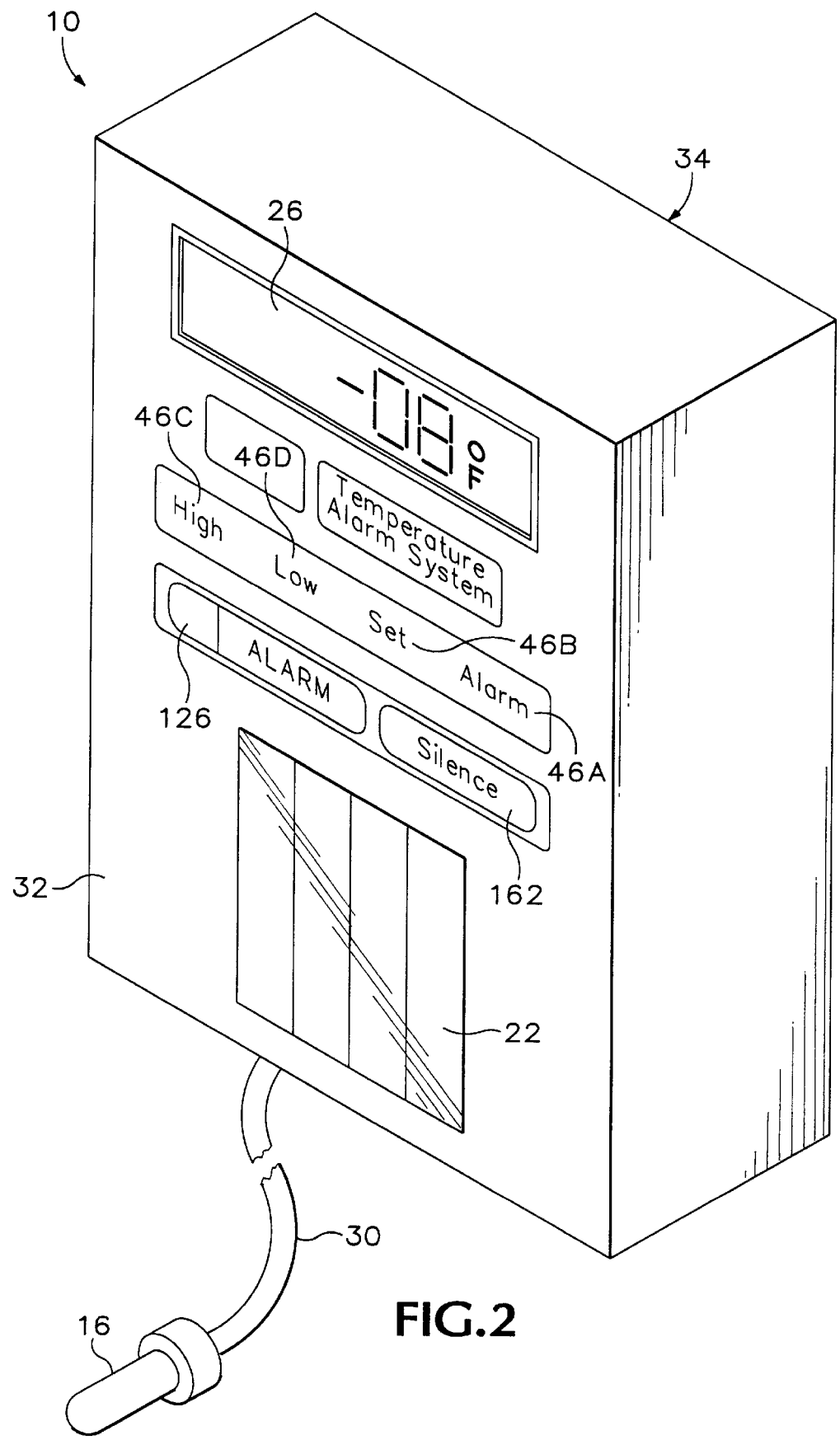
FIG. 2 is a perspective drawing of the temperature alarm system of FIG. 1 shown enclosed in a housing.

Referring now to FIG. 2, the temperature sensing module 12 is mounted to the front panel of a housing 34 so that the display 26 is visible outside of the housing. Thermocouple cable 30 is routed through an opening 36 in the bottom panel of the housing 34 so that the thermocouple probe 16 can be located remotely from the housing. The photocell 22 is mounted to the front panel of the housing so as to receive adequate illumination from available light sources. The alarm circuit 20 is preferably manufactured on a printed circuit board which is mounted parallel to the from panel of the housing such that the LED 126 is visible through an opening the front panel.

The HIGH, LOW, SET, and ALARM Switches 46A–46D, and SILENCE switch 162 are preferably membrane type switches fabricated integral with a faceplate 32 made of polyester film such as "MYLAR"™ brand film. The faceplate includes transparent portions aligned with the LCD display 26, the LED 126, and the photocell 22 so that these components are visible through the faceplate.

The DELAY switch 104, the ° C./° F. switch 170, and the SYSTEM ON/OFF switch 90, which are preferably implemented with a four-switch PC board mounted DIP switch assembly, are accessible through an access door (not shown) on the back of the housing. The access door also provides access to the terminal strip 168 as well as the batteries 48 and 50 which are mounted in battery holders.

The housing 34 preferably has hook and loop type fastening pads such as "VELCRO"™ brand pads on the back surface (not shown) of the housing. The pads have adhesive backings with protective film coverings. The housing is mounted by peeling the protective film from the pads and pressing the housing firmly against a mounting surface. The hook and loop fasteners allow the housing to be removed and remounted for easy servicing. The housing can be mounted on any convenient surface that is close to the enclosed space to be monitored and has an adequate ambient light source. Then, only the thermocouple cable 30 need be routed to the enclosed space to be monitored.

Having described and illustrated the principles of the invention in a preferred embodiment thereof, it should be apparent that the invention can be modified in arrangement and detail without departing from such principles. For example, LCD display 26 need not be an integral part of temperature sensing module 12. The LCD display could be coupled to the alarm circuit 20 to only provide a visual signal when a temperature alarm setting has been violated. The temperature sensing module could be any type of electronic apparatus capable of measuring temperature, storing a temperature alarm setting, and generating an alarm signal.

I claim all modifications and variations coming within the spirit and scope of the following claims:

1. An easy-to-install temperature alarm system comprising:

a temperature sensing module that generates an alarm signal when it senses a predetermined temperature;

a temperature sensing device coupled to the temperature sensing module through a cable, whereby the temperature sensing device can be positioned in a monitored space remote from the temperature sensing module;

an alarm coupled to the temperature sensing module for receiving the alarm signal, the alarm generating a warning responsive to the alarm signal;

a photocell coupled to the temperature sensing module for providing electric power to the module;

a housing;

a first battery coupled to the temperature sensing module to provide a first power supply voltage to the temperature sensing module; and a second battery connected in series with the first battery, and coupled to the alarm to provide a second power supply voltage to the alarm;

wherein the temperature sensing module, the alarm, and the photocell are disposed within the housing to provide a compact, self-contained unit that can be mounted in a convenient, occupied location, thereby eliminating power supply wiring and simplifying installation.

2. An easy-to-install temperature alarm system comprising:

a temperature sensing module that generates an alarm signal when it senses a predetermined temperature;

a temperature sensing device coupled to the temperature sensing module through a cable, whereby the temperature sensing device can be positioned in a monitored space remote from the temperature sensing module;

an alarm coupled to the temperature sensing module for receiving the alarm signal, the alarm generating a warning responsive to the alarm signal;

a photocell coupled to the temperature sensing module for providing electric power to the module; and a housing;

wherein the temperature sensing module, the alarm, and the photocell are disposed within the housing to provide a compact, self-contained unit that can be mounted in a convenient, occupied location, thereby eliminating power supply wiring and simplifying installation;

wherein the system has a charge rate of power consumption and an alarm rate of power consumption that is higher than the charge rate of power consumption, and the photocell has a power generating capacity sufficient to provide at least the charge rate of power consumption; and wherein the alarm includes an indicator for generating the warning and support circuitry for the indicator, and the alarm is adapted such that the indicator and its support circuitry are only enabled when the alarm signal is generated, thereby reducing power consumption when the alarm signal is not generated.

3. A system according to claim 2 wherein the support circuitry includes a counter.

4. A system according to claim 2 wherein the indicator is a visual indicator.

5. A system according to claim 2 wherein the indicator is an audible indicator.

6. An easy-to-install temperature alarm system comprising:
- a temperature sensing module having an output terminal, the temperature sensing module generating an alarm signal at the output terminal when a predetermined temperature is sensed;
- a temperature sensing device coupled to the temperature sensing module through a cable, whereby the temperature sensing device can be positioned in a monitored space remote from the temperature sensing module;
- an alarm having an input terminal connected to the output terminal of the temperature sensing module, the alarm generating a warning responsive to the alarm signal;
- a first battery coupled to the temperature sensing module to provide a first power supply voltage to the temperature sensing module;
- a second battery connected in series with the first battery, and coupled to the alarm to provide a second power supply voltage to the alarm;
- a photocell connected to the batteries to charge the batteries; and
- a housing;
- wherein the temperature sensing module, the alarm, the batteries, and the photocell are disposed within the housing to provide a compact, self-contained unit that can be mounted in a convenient, occupied location, thereby eliminating power supply wiring and simplifying installation.

7. A method of monitoring a temperature in an enclosed space comprising the steps of:
- providing a temperature sensing module, an alarm, and a photocell in a housing as a compact, self-contained unit;
- mounting the housing in an occupied location remote from the enclosed space;
- mounting a temperature sensing device in the enclosed space;
- coupling the temperature sensing device to the temperature sensing module through a cable;
- converting ambient light into electric power using the photocell;
- storing the electric power in a first battery and a second battery connected in series with the first battery;
- supplying electric power from the first battery to the temperature sensing module;
- detecting the temperature using the temperature sensing module; and
- generating a warning with an alarm circuit at the occupied location if the detected temperature violates a temperature threshold;
- wherein generating a warning includes supplying electric power from the second battery to the alarm circuit if the detected temperature violates the temperature threshold.

* * * * *